United States Patent
Tai et al.

(10) Patent No.: US 8,717,201 B2
(45) Date of Patent: May 6, 2014

(54) ELECTRONIC DEVICE

(75) Inventors: Chih-Wei Tai, Taoyuan County (TW);
Yi-Ching Liu, Taoyuan County (TW);
Cheng-Chieh Chuang, Taoyuan County (TW);
I-Fang Li, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 742 days.

(21) Appl. No.: 12/507,569

(22) Filed: Jul. 22, 2009

(65) Prior Publication Data
US 2010/0026531 A1 Feb. 4, 2010

(30) Foreign Application Priority Data
Jul. 23, 2008 (TW) ................................ 97127911 A

(51) Int. Cl.
*H03M 11/00* (2006.01)

(52) U.S. Cl.
USPC .................... 341/23; 341/20; 341/21; 341/22

(58) Field of Classification Search
USPC ................................................... 341/20–23
See application file for complete search history.

(56) References Cited

U.S. PATENT DOCUMENTS

| | | | | |
|---|---|---|---|---|
| 572,922 A * | 12/1896 | Iggulden et al. | ........... | 83/748 |
| 4,527,250 A * | 7/1985 | Galdun et al. | ........... | 715/700 |
| 4,549,279 A * | 10/1985 | Lapeyre | ........... | 708/145 |
| 5,151,696 A * | 9/1992 | Kasahara et al. | ........... | 341/22 |
| 5,408,044 A * | 4/1995 | Spiegel | ........... | 174/520 |
| 5,542,770 A * | 8/1996 | Lin | ........... | 400/477 |
| 5,579,002 A * | 11/1996 | Iggulden et al. | ........... | 341/23 |
| 5,920,308 A * | 7/1999 | Kim | ........... | 345/169 |
| 5,995,024 A * | 11/1999 | Kambayashi et al. | ........... | 341/22 |
| 6,707,447 B1 * | 3/2004 | Goranowski | ........... | 345/167 |
| 6,734,809 B1 * | 5/2004 | Olodort et al. | ........... | 341/22 |
| 6,750,803 B2 * | 6/2004 | Yates et al. | ........... | 341/176 |
| 7,335,843 B2 * | 2/2008 | Chan et al. | ........... | 200/310 |
| 7,512,427 B2 * | 3/2009 | Finke-Anlauff et al. | .. | 455/575.1 |

FOREIGN PATENT DOCUMENTS

| | | |
|---|---|---|
| DE | 3334648 | 4/1985 |
| TW | M333723 | 6/2008 |

* cited by examiner

*Primary Examiner* — Hai Phan
*Assistant Examiner* — Amine Benlagsir
(74) *Attorney, Agent, or Firm* — Birch, Stewart, Kolasch & Birch, LLP

(57) ABSTRACT

The application provides an electronic device. The electronic device includes a main body and a cover. The main body has a sheet and the sheet includes a first key set and a second key set. The cover, slidably disposed on the main body between a first configuration and a second configuration, includes a first portion and a second portion connected thereto. The first key set is visible through the first portion and the second portion covers the second key set when the cover is in the first configuration, and the second key set is visible through the first portion and the second portion covers the first key set when the cover is in the second configuration.

14 Claims, 13 Drawing Sheets

ELECTRONIC DEVICE

This Application claims priority of Taiwan Patent Application No. 097127911, filed on Jul. 23, 2008, the entirety of which is incorporated by reference herein.

BACKGROUND OF THE INVENTION

1. Field of the Invention

The application relates to an electronic device, and in particular, to an electronic device allowing the operator to clearly identify the position of the symbolic keys and the alphabetic keys when inputting information.

2. Description of the Related Art

Driven by technological development, demand for increased functionality in electronic devices has increased. Accordingly, increased functionality for keypads of electronic devices has also increased. Thus, operation of keypads has become more complex.

Referring to FIG. 1, the conventional electronic device 1 utilizes a single keypad 101 printed with alphabetic, numeric or punctuation characters thereon. When an operator desires to sequentially input different types of characters, the operator must physically switch among the desired types of characters (e.g. switching between alphabetic characters or numeric characters or punctuation characters), such as having to press two different keys. Thus, the operation is complex, often confusing and inconvenient for operators.

Accordingly, the number of keys or the keypad area may be increased to alleviate the deficiencies described previously. However, the solutions increase the size of the electronic device using the keypad and the arrangement of the keys is needed to be redesigned, thus increasing volume and costs.

BRIEF SUMMARY OF THE INVENTION

Accordingly, the application provides an electronic device. The electronic device includes a main body and a cover. The main body has a first key set and a second key set. The cover, slidably disposed on the main body between a first configuration and a second configuration, includes a first portion and a second portion connected thereto. The first portion faces the first key set and the second portion covers the second key set when the cover is in the first configuration, and the first portion faces the second key set and the second portion covers the first key set when the cover is in the second configuration.

The application provides an electronic device. The electronic device includes a main body and a cover. The main body includes a sheet and the sheet includes a first key set and a second key set. The cover, disposed on the main body, includes a first portion and a second portion connected thereto. At least one of the sheet and the cover is movable between a first configuration and a second configuration. The first key set is visible through the first portion and the second portion covers the second key set when the cover and the sheet are in the first configuration, and the second key set is visible through the first portion and the second portion covers the first key set when the cover and the sheet are in the second configuration.

A detailed description is given in the following embodiments with reference to the accompanying drawings.

BRIEF DESCRIPTION OF THE DRAWINGS

The application can be more fully understood by reading the subsequent detailed description and examples with references made to the accompanying drawings, wherein.

DETAILED DESCRIPTION OF THE INVENTION

Figure 1:
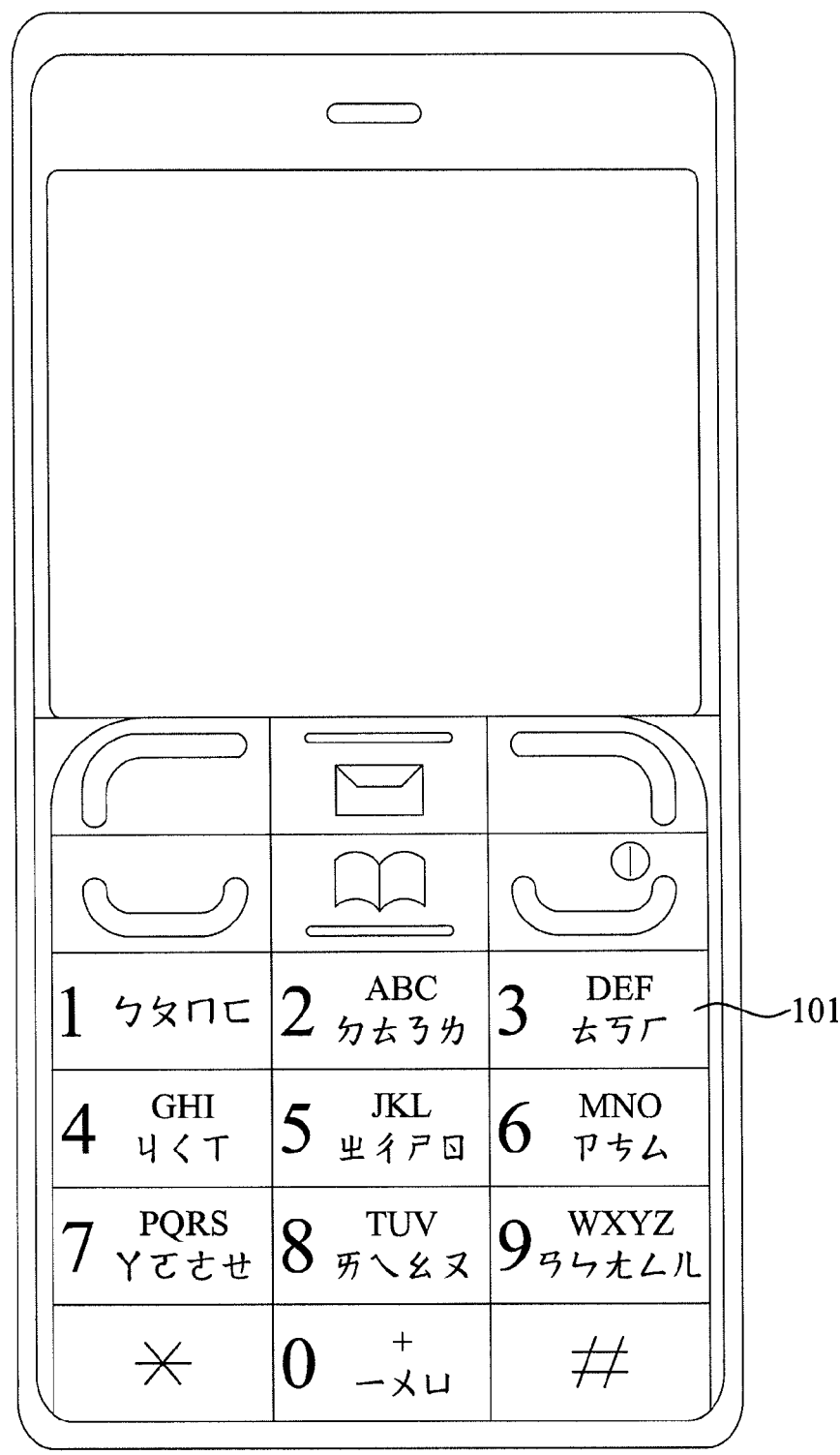
FIG. 1 is a schematic view of a conventional electronic device.
Figure 2:
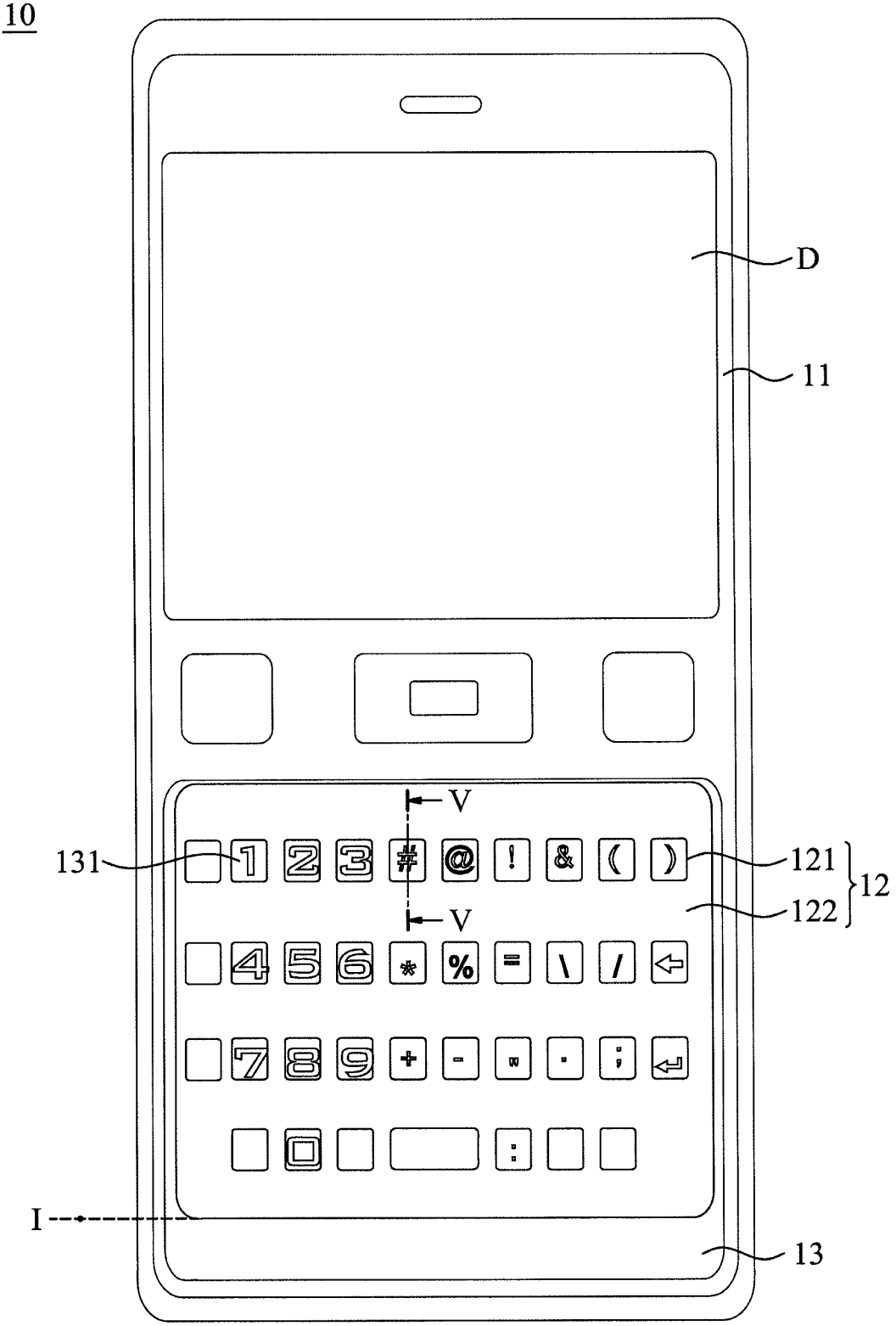
FIG. 2 is a schematic view of an electronic device of a first embodiment of the invention showing a cover in the first configuration.
Figure 3:
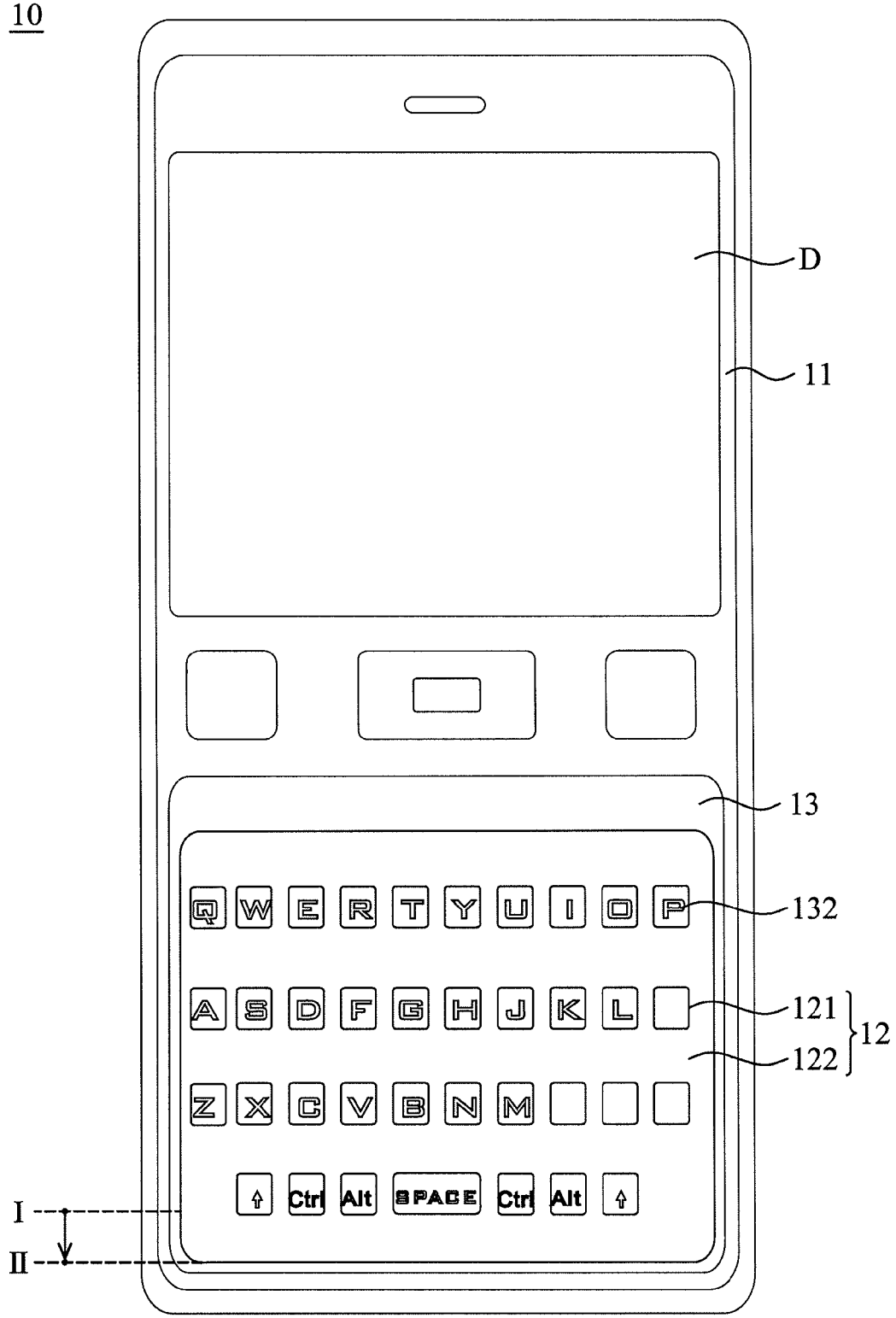
FIG. 3 is a schematic view of the electronic device of the first embodiment of the invention showing a cover in the second configuration.

For a first embodiment of the invention, please refer to FIGS. 2 and 3. FIG. 2 is a schematic view showing a cover 12 in a first configuration I. FIG. 3 is a schematic view showing a cover 12 in a second configuration II.

Figure 4:
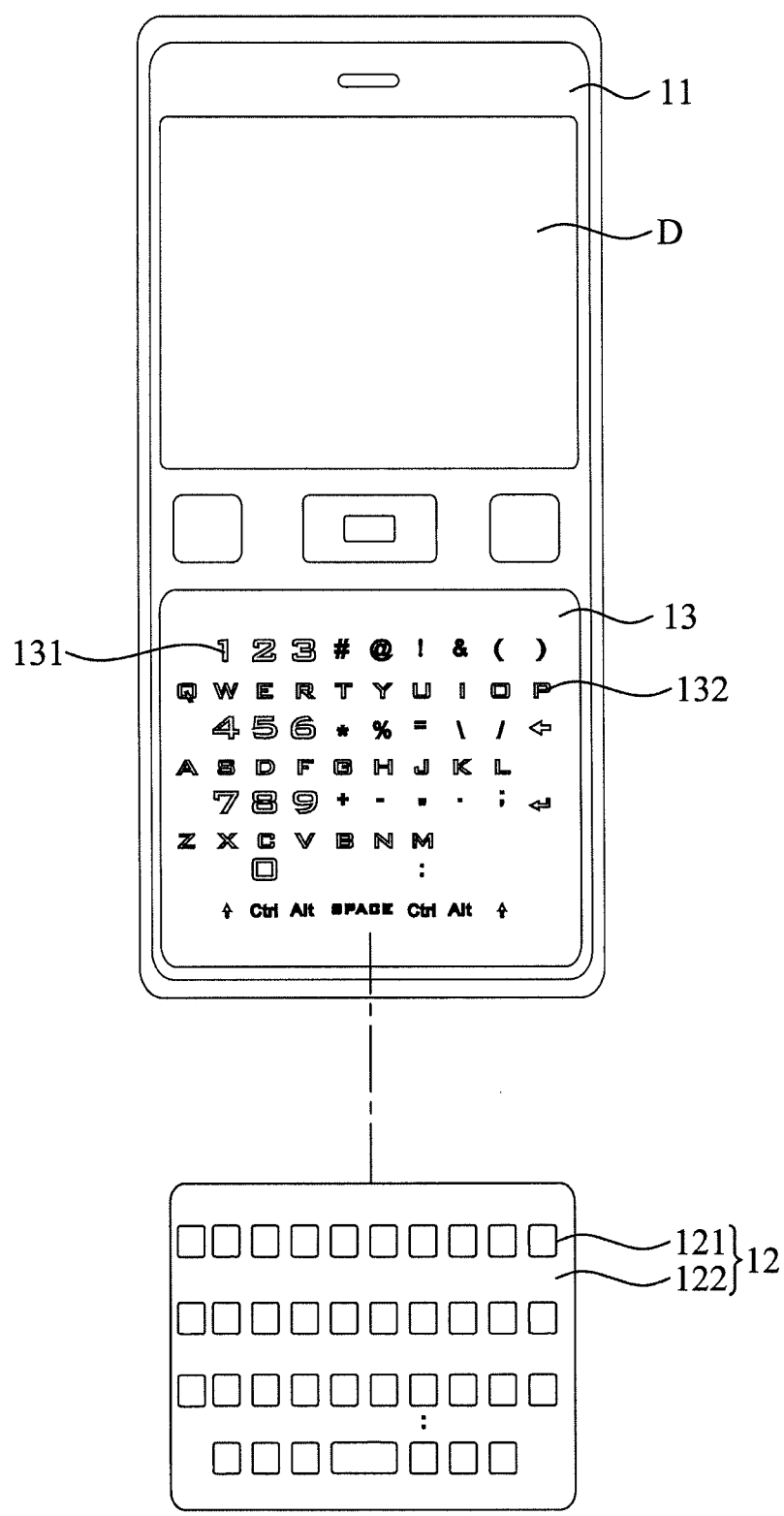
FIG. 4 is an exploded view of the electronic device of the first embodiment of the invention.

When the cover 12 is in the first configuration I (as shown in FIG. 2), the user sees a first key set 131 (symbolic keys such as numerical keys or special symbolic keys) of a sheet 13, and when the cover 12 moves from the first configuration I to the second configuration II (as shown in FIG. 3), the user sees a second key set 132 (alphabetic keys) of the sheet 13. The structure of the electronic device 10 is described as follows:

Referring to FIG. 4, the electronic device 10 of the first embodiment of the invention includes a main body, a cover 12 and a display module D, wherein the display module D is arranged on an upper portion of the main body 11, and the cover 12 is arranged on a lower portion of the main body 11.

The cover 12, slidably disposed on the main body 11 between the first configuration I and the second configuration II, includes first portion 121 and a second portion 122. The second portion 122 surrounds the first portion 121, and the first portion 121 are apertures in the embodiment. Additionally, the material of the cover 12 is plastic or metal.

Figure 5:
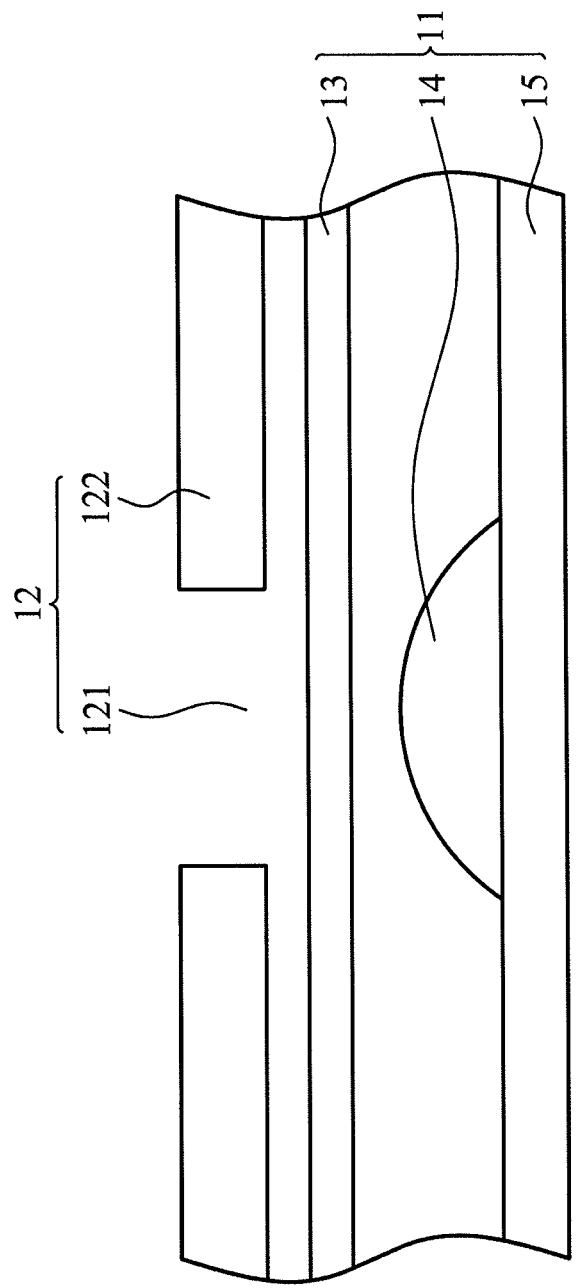
FIG. 5 is a sectional view cut along line V-V of the electronic device in FIG. 2.

Referring to FIGS. 2 and 5, wherein FIG. 5 is a sectional view cut along line V-V of the electronic device in FIG. 2. The main body 11 includes a sheet 13, a dome switch 14 and a circuit board 15. The dome switch 14 is disposed above the circuit board 15, and the sheet 13 is disposed above the dome switch 14.

The sheet 13 has a first key set 131 and a second key set 132. Each of the keys thereof is marked with different signs. For example, the first key set 131 is marked with numbers (e.g. 1, 2, 3, 4) and special symbols (e.g. !, #, %, &), and the second key set 132 is marked with alphabets (e.g. Q, W, E, R). When the user presses down a key, the corresponding dome switch 14 deforms, which allows the circuit board 15 to send out a signal of the corresponding sign. In the present embodiment, the dome switch 14 and the circuit board 15 can be replaced by other apparatuses in order to respond to the pressing action by the user and output the signal of the corresponding sign. For example, the dome switch 14 and the circuit board 15 can be replaced by a capacitive touchpad, a resistive touchpad or other apparatuses with similar functions in order to respond to the pressing action by the user and output the signal of the corresponding sign. Furthermore, when the electronic device 10 of the embodiment is assembled with a capacitive touchpad panel or a resistive touchpad, the main body may further include a vibrator (not shown) in order to respond to the pressing action by the user and output a vibration feedback.

When the cover 12 is in the first configuration I (as shown in FIG. 2), the first key set 131 (symbolic keys such as numerical keys and special symbolic keys) of the sheet 13 is visible through the first portion 121 (apertures) of the cover 12, and the second portion 122 of the cover 12 covers the second key set 132 (alphabetic keys) of the sheet 13.

When the cover 12 moves from the first configuration I to the second configuration II (as shown in FIG. 3), the second key set 132 (alphabetic keys) of the sheet 13 is visible through the first portion 121 (apertures) of the cover 12, and the second portion 122 of the cover 12 covers the first key set 131 (symbolic keys) of the sheet 13.

As described above, the cover 12 of the electronic device 10 of the embodiment is provided with first portion 121 (apertures) and a second portion 122, and the cover 12 is slidably disposed on the main body 11. This kind of design allows the user to clearly identify the position of the keys and quickly switch among different inputting modes (between the alphabetic keys or the symbolic keys) when inputting information. Thus, the size, appearance and keypad layout of the electronic devices do not need to be redesigned and information input is simplified and made more convenient.

Figure 6:
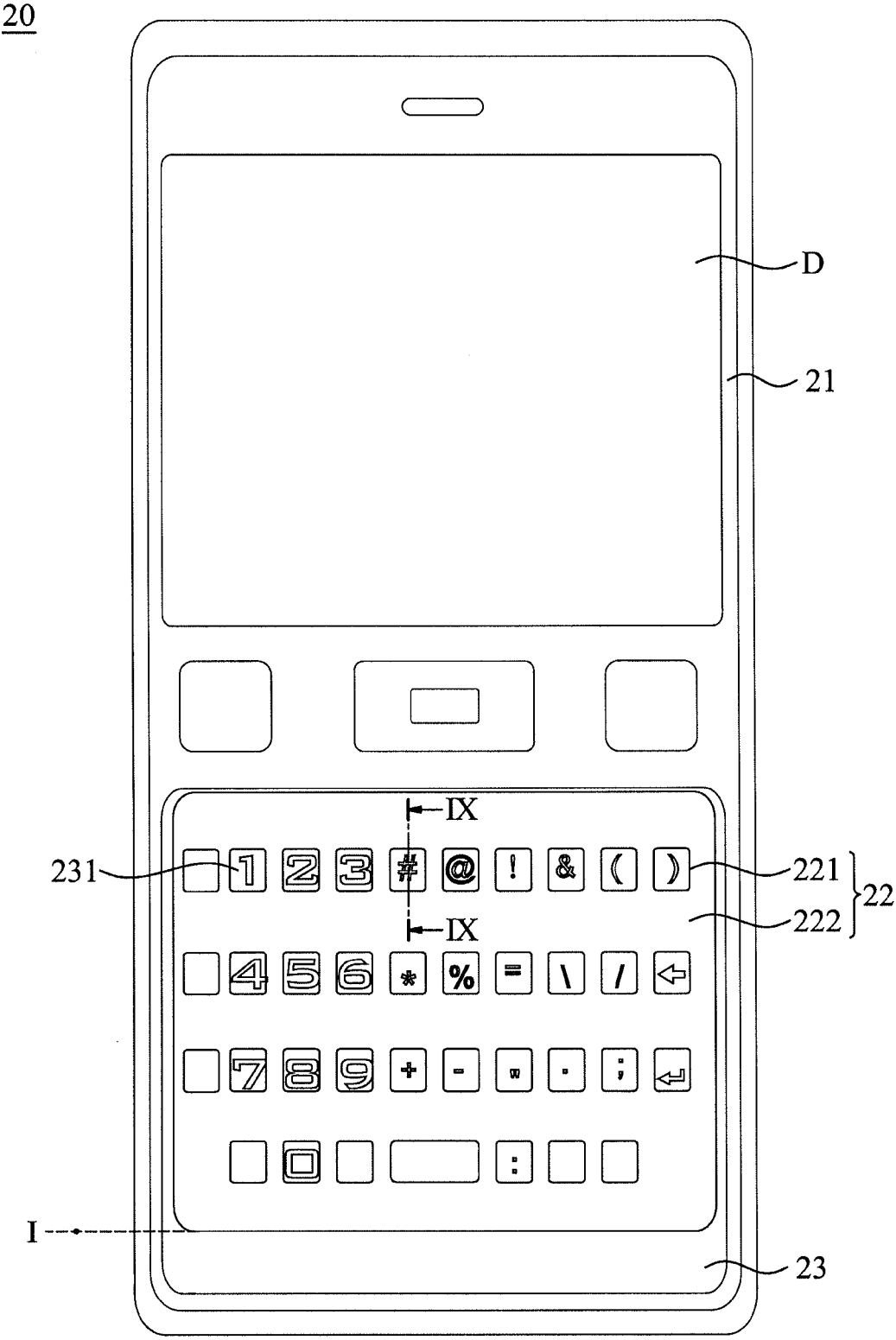
FIG. 6 is a schematic view of an electronic device of a second embodiment of the invention showing a cover in the first configuration.
Figure 7:
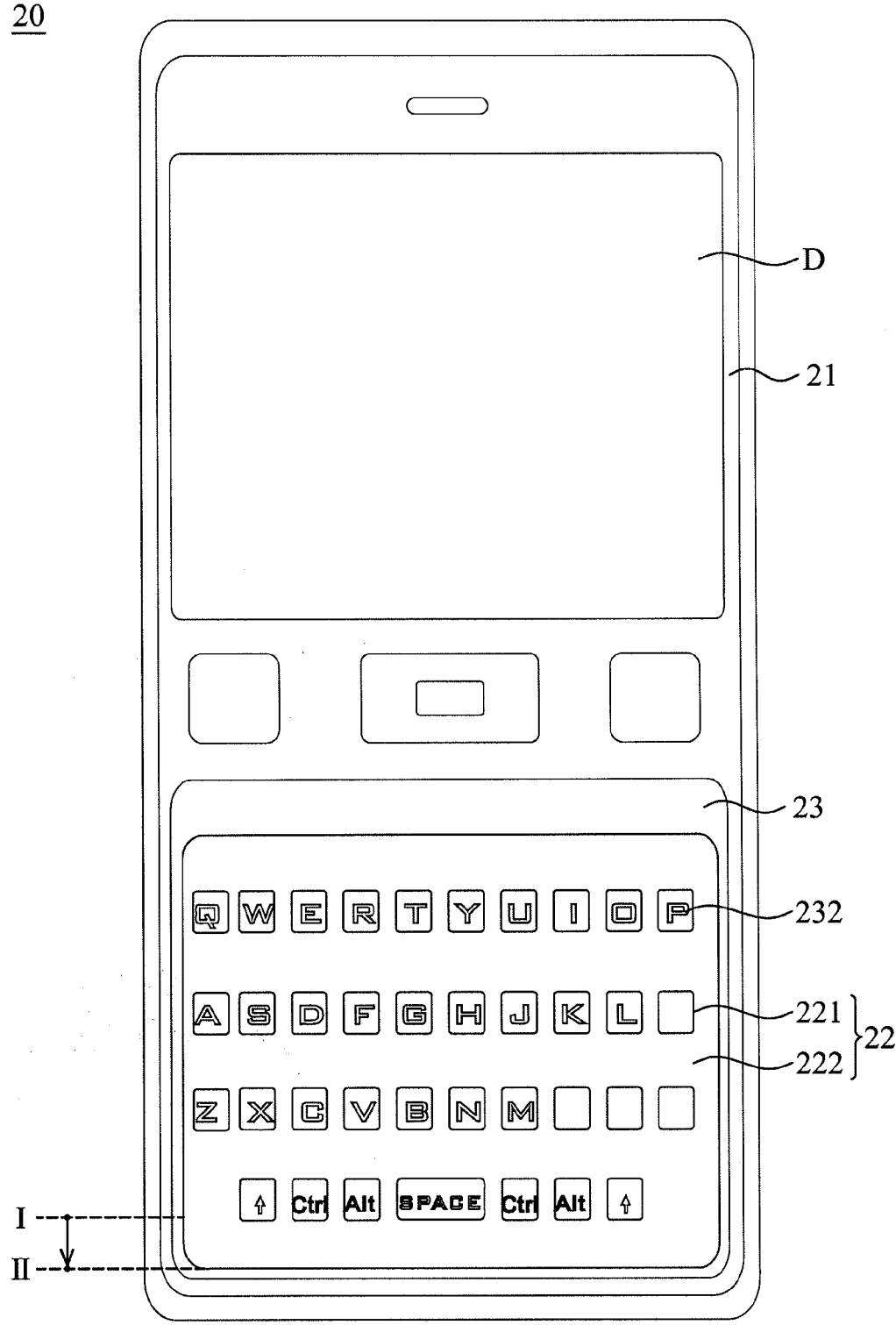
FIG. 7 is a schematic view of the electronic device of the second embodiment of the invention showing a cover in the second configuration.

For a second embodiment of the invention, please refer to FIGS. 6 and 7. FIG. 6 is a schematic view showing a cover 22 in a first configuration I. FIG. 7 is a schematic view showing a cover 22 in a second configuration II.

Figure 8:
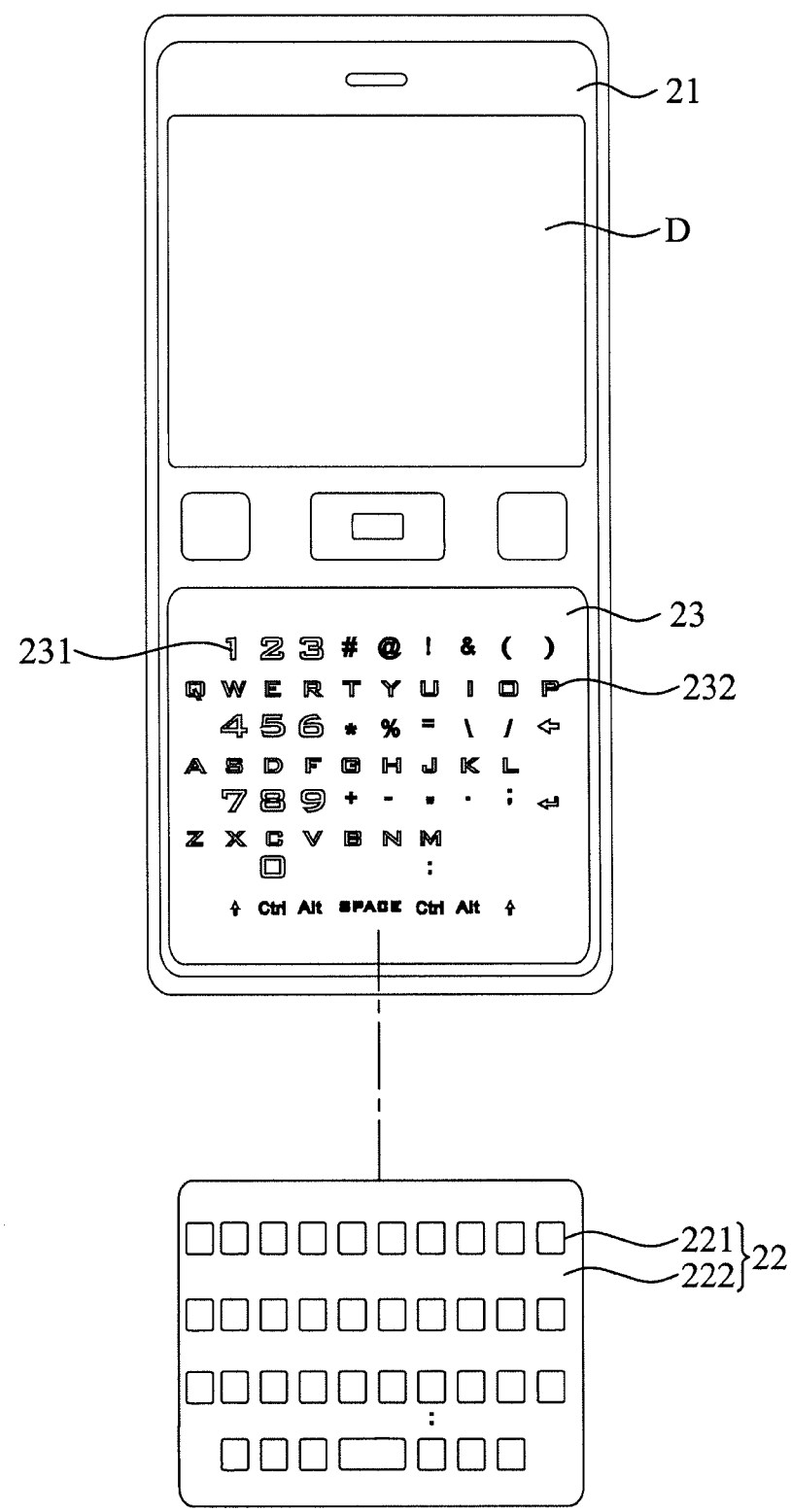
FIG. 8 is an exploded view of the electronic device of the second embodiment of the invention.
Figure 9:
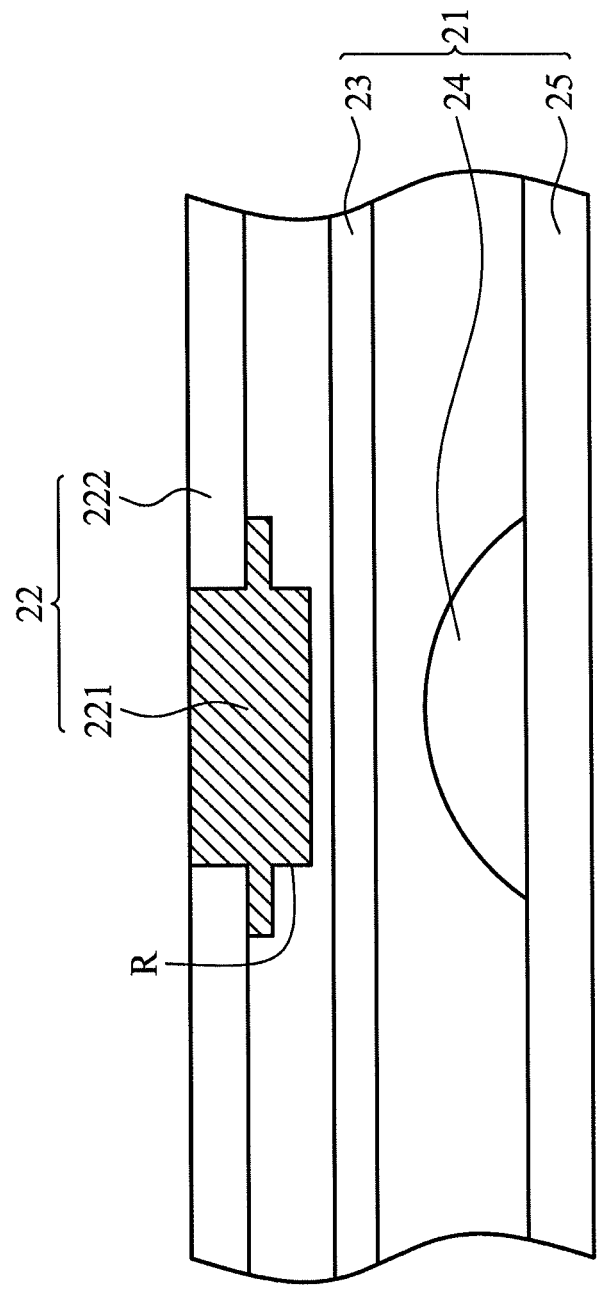
FIG. 9 is a sectional view cut along line IX-IX of the electronic device in FIG. 6.

When the cover 22 is in the first configuration I (as shown in FIG. 6), the user sees a first key set 231 (symbolic keys) of a sheet 23, and when the cover 22 moves from the first configuration I to the second configuration II (as shown in FIG. 7), the user sees a second key set 232 (alphabetic keys) of the sheet 23. The structure of the electronic device 20 is described as follows:

Referring to FIGS. 8 and 9, wherein FIG. 9 is a sectional view cut along line IX-IX of the electronic device in FIG. 6. The electronic device 20 of the second embodiment of the invention includes a main body 21 and a cover 22.

The cover 22, slidably disposed on the main body 21 between the first configuration I and the second configuration II, includes a first portion 221 and a second portion 222. The second portion 222 surrounds the first portion 221, and the first portion 221 are solid structures made of transparent material (such as transparent protrusions) in the embodiment. The solid structures protrude from the second portion 222 toward the main body 21 (as shown in FIG. 9), and connect with the second portion 222. For example, the first portion 221 and the second portion 222 can be formed by performing an injection molding process, twice. In other words, the first portion 221 is first formed by an injection molding process, and the second portion 222 is then molded with the first portion 221 by an injection molding process again.

The main body 21 includes a sheet 23, a dome switch 24 and a circuit board 25. The dome switch 24 is disposed above the circuit board 25, and the sheet 23 is disposed above the dome switch 24.

The sheet 23 has a first key set 231 and a second key set 232. Each of the keys thereof is marked with different signs. For example, the first key set 231 is marked with numbers (e.g. 1, 2, 3, 4) and special symbols (e.g. !, #, %, &), and the second key set 232 is marked with alphabets (e.g. Q, W, E, R). When the user presses down a key, the corresponding dome switch 24 deforms, which allows the circuit board 25 to send out a signal of the corresponding sign. In detail, because the first portion 221 has protrusions (as shown in FIG. 9) protruding toward the sheet 23, the protrusions of the first portion 221 make it easier to push the dome switch 24 when the user presses down the first portion 221.

In the present embodiment, the dome switch 24 and the circuit board 25 can be replaced by other apparatuses in order to respond to the pressing action by the user and output the signal of the corresponding sign. For example, the dome switch 24 and the circuit board 25 can be replaced by a capacitive touchpad, a resistive touchpad or other apparatuses with similar functions in order to respond to the pressing action by the user and output the signal of the corresponding sign. Furthermore, when the electronic device 20 of the embodiment is assembled with a capacitive touchpad or a resistive touchpad, the main body may further include a vibrator (not shown) in order to respond to the pressing action by the user and output a vibration feedback.

When the cover 22 is in the first configuration I (as shown in FIG. 6), the first key set 231 (symbolic keys) of the sheet 23 is visible through the first portion 221 (transparent protrusions) of the cover 22, and the second portion 222 of the cover 22 covers the second key set 232 (alphabetic keys) of the sheet 23.

When the cover 22 moves from the first configuration I to the second configuration II (as shown in FIG. 7), the second key set 232 (alphabetic keys) of the sheet 23 is visible through the first portion 221 (transparent protrusions) of the cover 22, and the second portion 222 of the cover 22 covers the first key set 231 (symbolic keys) of the sheet 23.

As described above, the cover 22 of the electronic device 20 of the embodiment is provided with first portion 221 (transparent protrusions) and second portion 222, and the cover 22 slidably disposed on the main body 21. This kind of design allows the user to clearly identify the position of the keys and quickly switch among different inputting modes (between the alphabetic keys or the symbolic keys) when inputting information. Thus, the size, appearance and keypad layout of the electronic devices do not need to be redesigned and information input is simplified and made more convenient.

Figure 10:
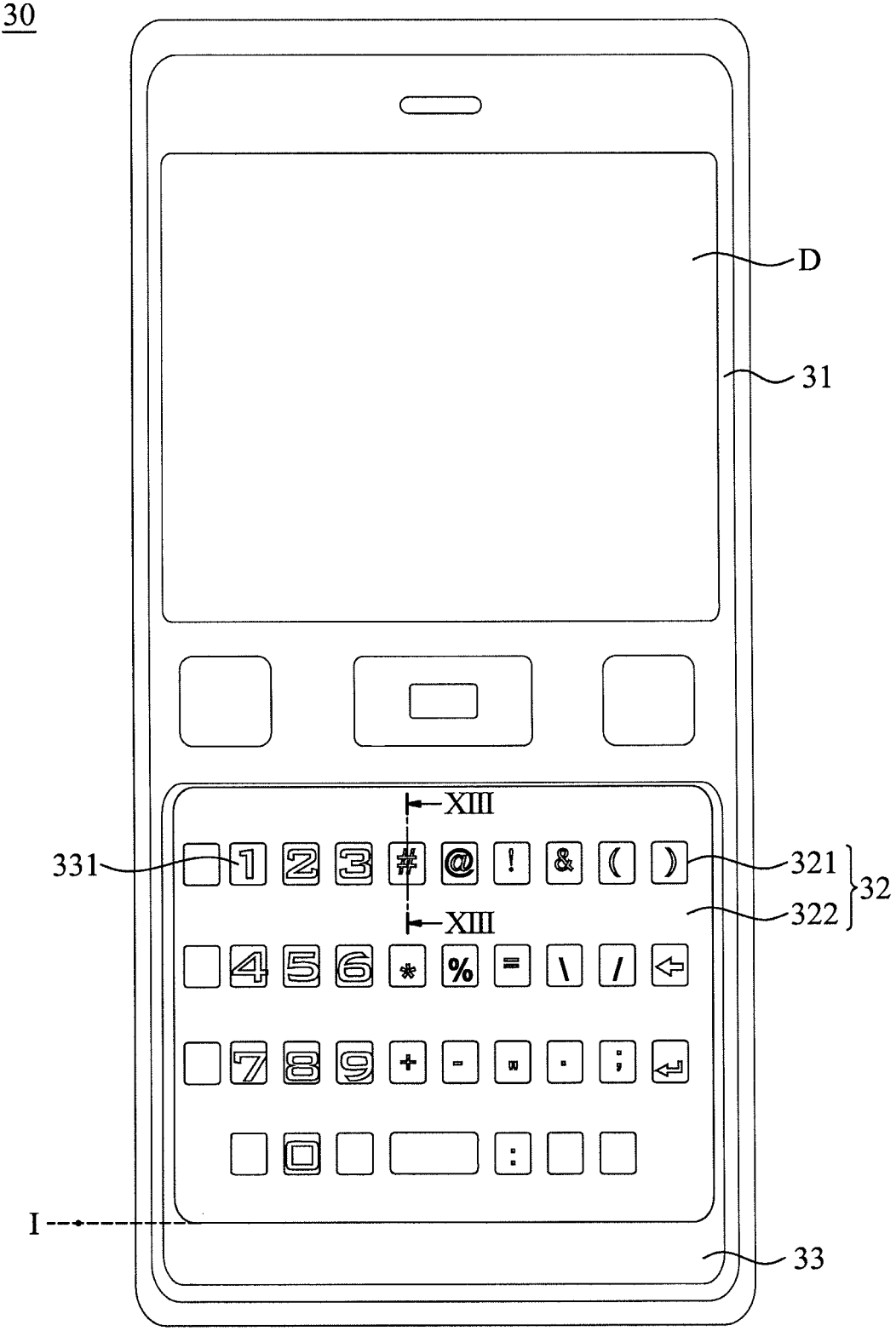
FIG. 10 is a schematic view of an electronic device of a third embodiment of the invention showing a cover in the first configuration.
Figure 11:
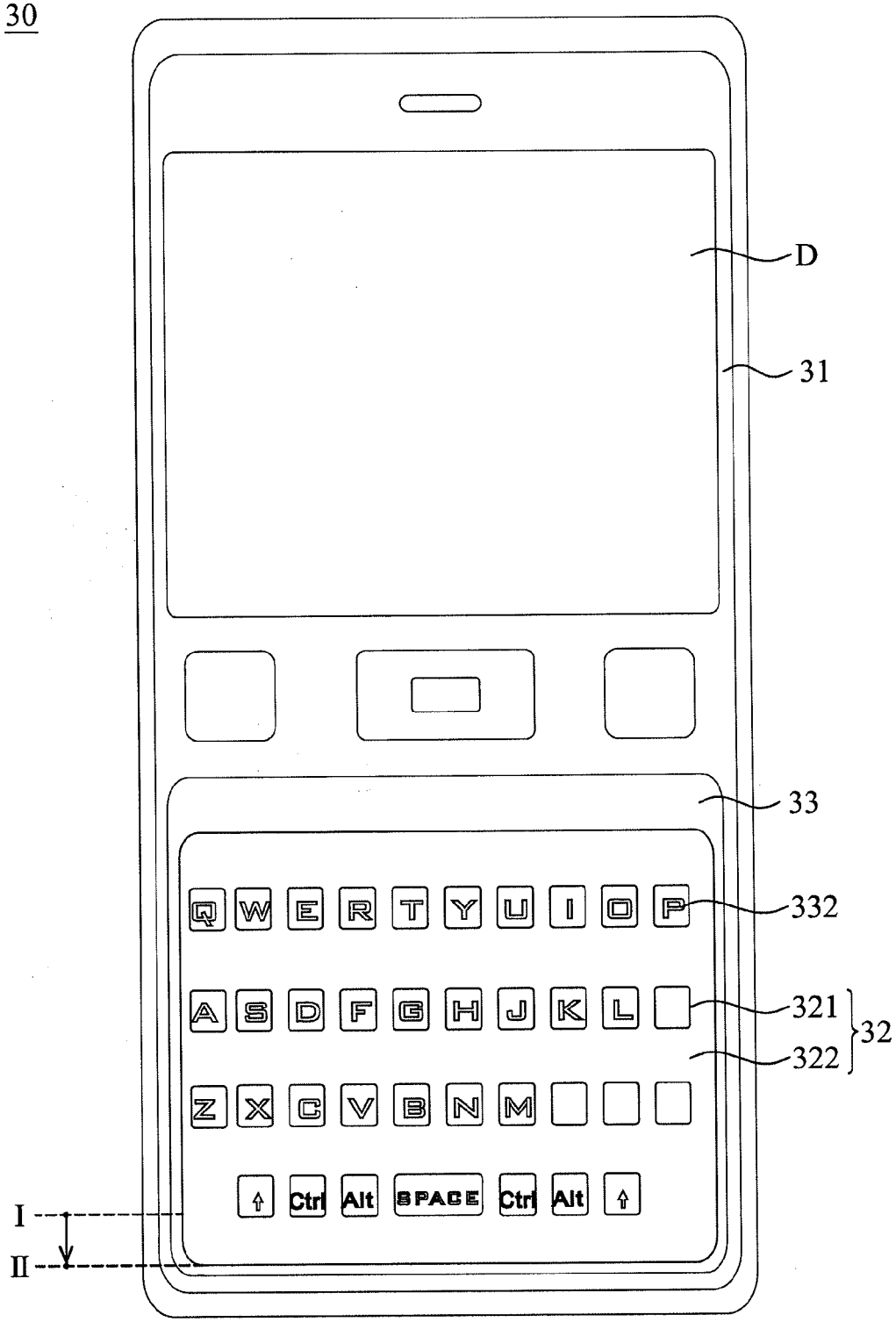
FIG. 11 is a schematic view of the electronic device of the third embodiment of the invention showing a cover in the second configuration.

For a third embodiment of the invention, please refer to FIGS. 10 and 11. FIG. 10 is a schematic view showing a cover 32 in a first configuration I. FIG. 11 is a schematic view showing a cover 32 in a second configuration II.

Figure 12:
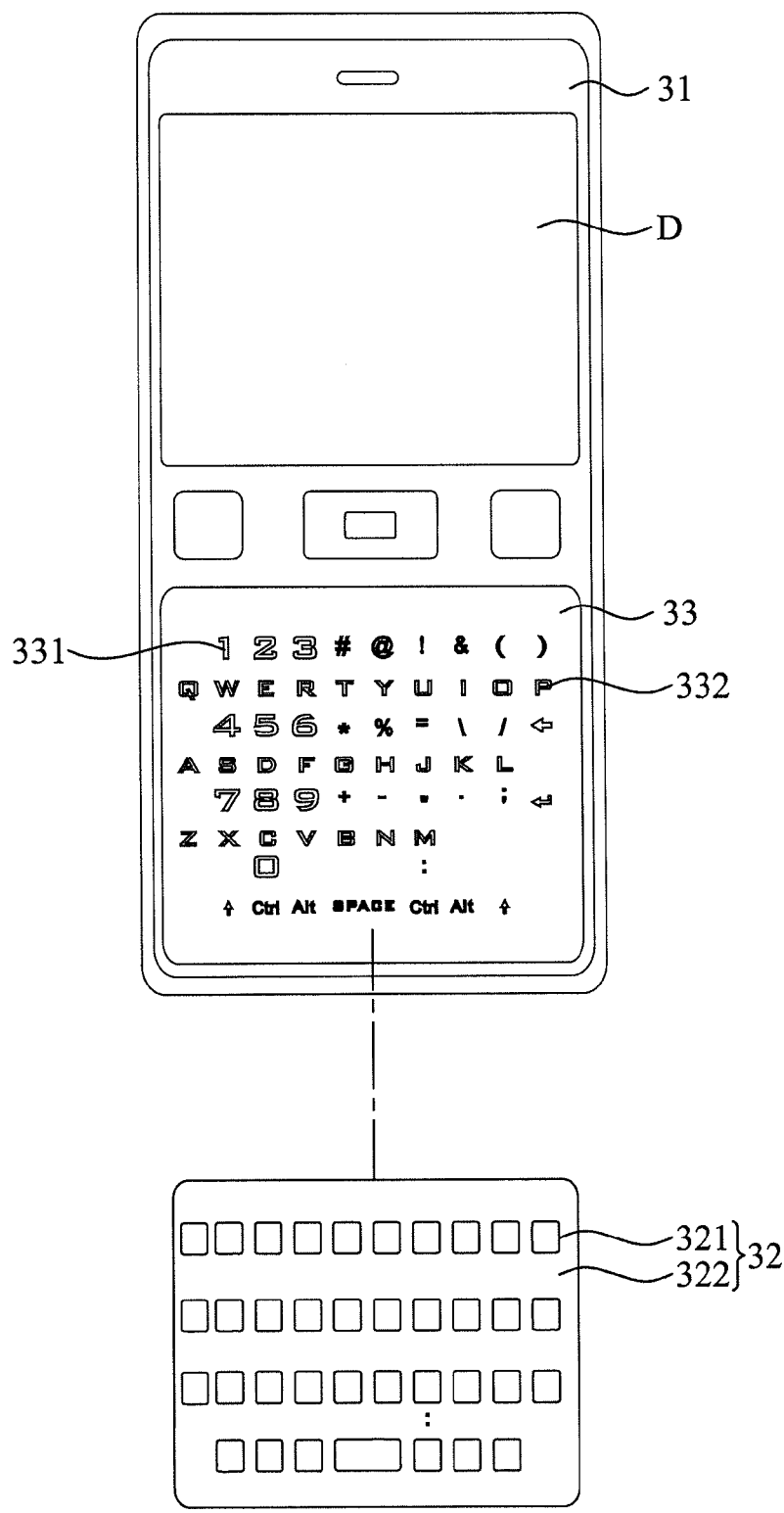
FIG. 12 is an exploded view of the electronic device of the third embodiment of the invention.
Figure 13:
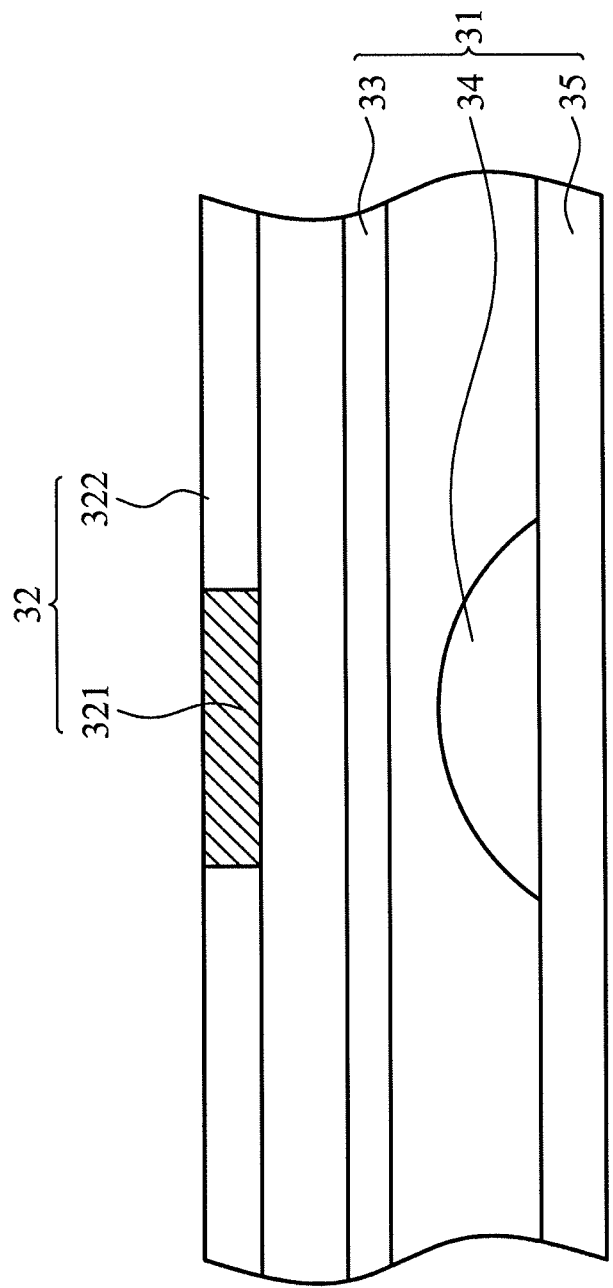
FIG. 13 is a sectional view cut along line XIII-XIII of the electronic device in FIG. 10.

When the cover 32 is in the first configuration I (as shown in FIG. 10), the user sees a first key set 331 (symbolic keys) of a sheet 33, and when the cover 32 moves from the first configuration I to the second configuration II (as shown in FIG. 11), the user sees a second key set 332 (alphabetic keys) of the sheet 33. The structure of the electronic device 30 is described as follows:

Referring to FIGS. 12 and 13, wherein FIG. 13 is a sectional view cut along line XIII-XIII of the electronic device in FIG. 10. The electronic device 30 of the third embodiment of the invention includes a main body 31 and a cover 32.

The cover 32, slidably disposed on the main body 31 between the first configuration I and the second configuration II, includes a first portion 321 and a second portion 322. The second portion 322 surrounds the first portion 321, and the first portion 321 is a transparent film made of transparent material in the embodiment. The transparent film is coplanar with the second portion 322 (as shown in FIG. 13), and connected with the second portion 322. For example, the first portion 321 and the second portion 322 can be formed by performing an injection molding process, twice. In other words, the first portion 321 is first formed by an injection molding process, and the second portion 322 is then molded with the first portion 321 by an injection molding process again.

The main body 31 includes a sheet 33, a dome switch 34 and a circuit board 35. The dome switch 34 is disposed above the circuit board 35, and the sheet 33 is disposed above the dome switch 34.

The sheet 33 has a first key set 331 and a second key set 332. Each of the keys thereof is marked with different signs. For example, the first key set 331 is marked with numbers (e.g. 1, 2, 3, 4) and special symbols (e.g. !, #, %, &), and the second key set 332 is marked with alphabets (e.g. Q, W, E, R). When the user presses down a key, the corresponding dome switch 34 deforms, which allows the circuit board 35 to send out a signal of the corresponding sign. In the present embodiment, the dome switch 34 and the circuit board 35 can be replaced by other apparatuses in order to respond to the pressing action by the user and output the signal of the corresponding sign. For example, the dome switch 34 and the circuit board 35 can be replaced by a capacitive touchpad, a resistive touchpad or other apparatuses with similar functions in order to respond to the pressing action by the user and output the signal of the corresponding sign. Furthermore, when the electronic device 30 of the embodiment is assembled with a capacitive touchpad or a resistive touchpad, the main body may further include a vibrator (not shown) in order to response pressing action by the user and output a vibration feedback.

When the cover 32 is in the first configuration I (as shown in FIG. 10), the first key set 331 (symbolic keys) of the sheet 33 is visible through the first portion 321 (transparent film) of the cover 32, and the second portion 322 of the cover 32 covers the second key set 332 (alphabetic keys) of the sheet 33.

When the cover 32 moves from the first configuration I to the second configuration II (as shown in FIG. 11), the second key set 332 (alphabetic keys) of the sheet 33 is visible through the first portion 321 (transparent film) of the cover 32, and the second portion 322 of the cover 32 covers the first key set 331 (symbolic keys) of the sheet 33.

As described above, the cover 32 of the electronic device 30 of the embodiment is provided with first portion 321 (transparent film) and a second portion 322, and is slidably disposed on the main body 31. This kind of design allows the user to clearly identify the position of the keys and quickly switch among different inputting modes (between the alphabetic keys or the symbolic keys) when inputting information. Thus, the size, appearance and keypad layout of the electronic devices do not need to be redesigned and information input is simplified and made more convenient.

In the above embodiments, the cover slides on the main body between the first configuration and the second configuration to show or hide the first key set or the second key set, but it is not limited thereto. In other embodiment, the sheet can be movable between a first configuration and a second configuration to show or hide the first key set or the second key set. In another embodiment, the cover and the sheet can be movable between a first configuration and a second configuration to show or hide the first key set or the second key set.

In the above embodiments the display screen and the cover are respectively located on the upper portion and the lower portion of the main body. This type of electronic device is a so called bar-type electronic device. However, the disclosed technique can also be applied to a flip-type electronic device. That is, the display screen can be pivotally connected to the main body, such that the display screen is able to stack on the main body or maintain an angle therebetween. The disclosed technique of the invention can also be applied to a slide-type electronic device. That is, the display screen can slide relatively on the main body, such that the display screen is able to stack on the main body or to be opened relatively in a downward direction or a sideward direction. In sum, the electronic device can be a bar-type electronic device, a flip-type electronic device, a slide-type electronic device or other type of portable electronic device.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
   a main body, comprising a sheet and the sheet comprises a first key set and a second key set; and
   a cover, slidably disposed on the main body between a first configuration and a second configuration, and comprising a first portion and a second portion connected thereto, wherein the first portion and the second portion of the cover are slidable between the first configuration and the second configuration,
   wherein the first key set is visible through the first portion and the second portion covers the second key set when the cover and the sheet are in the first configuration, and the second key set is visible through the first portion and the second portion covers the first key set when the cover and the sheet are in the second configuration,
   wherein the first portion of the cover is non-movable with respect to the second portion of the cover,
   wherein keys of the first key set and the second key set are configured to be pressed to send signals, and
   wherein the first portion comprises a plurality of apertures filled with a transparent material.

2. The electronic device as claimed in claim 1, wherein the plurality of apertures filled with a transparent material is protruding from the cover toward the main body.

3. The electronic device as claimed in claim 1, wherein the first portion and the second portion are substantially coplanar.

4. The electronic device as claimed in claim 1, wherein the first key set comprises at least one symbolic key, and the second key set comprises at least one alphabetic key.

5. The electronic device as claimed in claim 4, wherein the symbolic key comprises a numerical key or a special symbolic key.

6. The electronic device as claimed in claim 1, further comprising a display module arranged on the main body, wherein the display module is located on an upper portion of the main body, and the cover is located on a lower portion of the main body.

7. The electronic device as claimed in claim 1, wherein the electronic device is a bar-type electronic device, a flip-type electronic device or a slide-type electronic device.

8. An electronic device, comprising:
- a main body, comprising a sheet and the sheet comprises a first key set and a second key set; and
- a cover, disposed on the main body and comprising a first portion and a second portion connected thereto, wherein the cover is moveable between a first configuration and a second configuration, wherein the first portion and the second portion of the cover are movable between the first configuration and the second configuration, wherein the first key set is visible through the first portion and the second portion covers the second key set when the cover and the sheet are in the first configuration, and the second key set is visible through the first portion and the second portion covers the first key set when the cover and the sheet are in the second configuration, wherein the first portion of the cover is non-movable with respect to the second portion of the cover, wherein keys of the first key set and the second key set are configured to be pressed to send signals, and wherein the first portion comprises a plurality of apertures filled with a transparent material.

9. The electronic device as claimed in claim 8, wherein the plurality of apertures filled with a transparent material is protruding from the cover toward the main body.

10. The electronic device as claimed in claim 8, wherein the first portion and the second portion are substantially coplanar.

11. The electronic device as claimed in claim 8, wherein the first key set comprises at least one symbolic key, and the second key set comprises at least one alphabetic key.

12. The electronic device as claimed in claim 11, wherein the symbolic key comprises a numerical key or a special symbolic key.

13. The electronic device as claimed in claim 8, further comprising a display module arranged on the main body, wherein the display module is located on an upper portion of the main body, and the cover is located on a lower portion of the main body.

14. The electronic device as claimed in claim 8, wherein the electronic device is a bar-type electronic device, a flip-type electronic device or a slide-type electronic device.

\* \* \* \* \*